US012771619B2

(12) United States Patent
Woodworth et al.

(10) Patent No.: US 12,771,619 B2
(45) Date of Patent: Oct. 20, 2026

(54) SYSTEMS AND METHODS FOR PREDICTING OUTCOME OF NETWORK CONFIGURATION CHANGES

(71) Applicant: CenturyLink Intellectual Property LLC, Broomfield, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 267 days.

(21) Appl. No.: 18/327,947

(22) Filed: Jun. 2, 2023

(65) Prior Publication Data

US 2023/0396509 A1 Dec. 7, 2023

Related U.S. Application Data

(60) Provisional application No. 63/365,975, filed on Jun. 7, 2022.

(51) Int. Cl.
*H04L 41/147* (2022.01)
*H04L 41/0803* (2022.01)

(52) U.S. Cl.
CPC ........ *H04L 41/147* (2013.01); *H04L 41/0803* (2013.01)

(58) Field of Classification Search
CPC ............... H04L 41/147; H04L 41/0803; H04L 41/0813
See application file for complete search history.

(56) References Cited

U.S. PATENT DOCUMENTS

| | | | | |
|---|---|---|---|---|
| 10,552,249 | B1 * | 2/2020 | Johansson | G06F 11/079 |
| 2019/0132214 | A1 * | 5/2019 | Porras | H04L 41/147 |
| 2021/0111966 | A1 * | 4/2021 | Qaadri | H04W 24/04 |
| 2021/0258808 | A1 * | 8/2021 | Mahimkar | H04W 16/18 |
| 2023/0216737 | A1 * | 7/2023 | Borsos | H04L 41/0813 709/221 |
| 2024/0056366 | A1 * | 2/2024 | Behera | H04L 41/0883 |

* cited by examiner

*Primary Examiner* — Schquita D Goodw
*Assistant Examiner* — Mehulkumar J Shah

(57) ABSTRACT

In large networks, configuration changes made to the network may have effects the extent of which is not easily foreseen before the configuration change is implemented. For example, the deployment of a new filter to the routers of a network may have the effect of disconnecting a larger portion of the network than was expected, and the recognition and correcting of such unintended effects may occur after a sufficient delay that users of the network may be inconvenienced. As such, a system and method for predicting outcomes of network configuration changes are provided.

16 Claims, 7 Drawing Sheets

SYSTEMS AND METHODS FOR PREDICTING OUTCOME OF NETWORK CONFIGURATION CHANGES

CROSS-REFERENCE TO RELATED APPLICATIONS

This application claims the benefit of U.S. Provisional Application No. 63/365,975 filed Jun. 7, 2022, entitled “Systems and Methods for Predicting Outcome of Network Configuration Changes,” which is incorporated herein by reference in its entirety.

FIELD

One or more aspects of examples according to the present disclosure relate to network management, and more particularly to a system and method for predicting outcomes of network configuration changes.

BACKGROUND

In large networks, configuration changes made to the network may have effects the extent of which is not easily foreseen before the configuration change is implemented. For example, the deployment of a new filter to the routers of a network may have the effect of disconnecting a larger portion of the network than was expected, and the recognition and correcting of such unintended effects may occur after a sufficient delay that users of the network may be inconvenienced.

It is with respect to this general technical environment that aspects of the present disclosure are related.

SUMMARY

A system and method for predicting outcomes of network configuration changes is provided. In an aspect, a method includes receiving, at a first device and from a requestor, a request for a network impact assessment for a first network configuration change; determining, by the first device, a first set of one or more impacted devices, wherein the first network configuration change would affect communication between the first device and a second device, and the first set comprises at least the second device; sending, by the first device to the second device, the request for the network impact assessment; and sending, by the first device to the requestor, at least the first set of one or more impacted devices.

In another aspect, the present application discloses a system comprising a first device. In examples, the first device comprises at least one processing circuit; and memory, operatively connected to the at least one processing circuit and storing instructions that, when executed by the at least one processing circuit, cause the first device to perform a method. In examples, the method comprises: receiving, from a requestor, a request for a network impact assessment for a first network configuration change; determining a first set of one or more impacted devices, wherein the first network configuration change would affect communication between the first device and a second device, and the first set comprises at least the second device; sending, to the second device, the request for the network impact assessment; and sending, to the requestor, at least the first set of one or more impacted devices.

In another aspect, the present application discloses a method, comprising: receiving, by a requestor, a request to make a network configuration change, the request including an indication of a maximum impact factor; sending, by the requestor, to a first device, a request for a network impact assessment for the network configuration change; receiving, by the requestor, from the first device, a response to the request for the network impact assessment; determining, by the requestor, based on the response, an impact factor; determining that the impact factor is less than the maximum impact factor; and in response to determining that the impact factor is less than the maximum impact factor, automatically approving the request to make the network configuration change and causing the network configuration change to be implemented.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following Figures.

DETAILED DESCRIPTION

The detailed description set forth below in connection with the appended drawings is intended as a description of exemplary embodiments of a system and method for predicting outcomes of network configuration changes provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

When managing a large network, network administrators may on occasion make configuration changes within the network, such as changing filters or making route modifications in routers in the network. Such changes may have unintended consequences, such as for example denying access to a set of users of the network.

Figure 1:
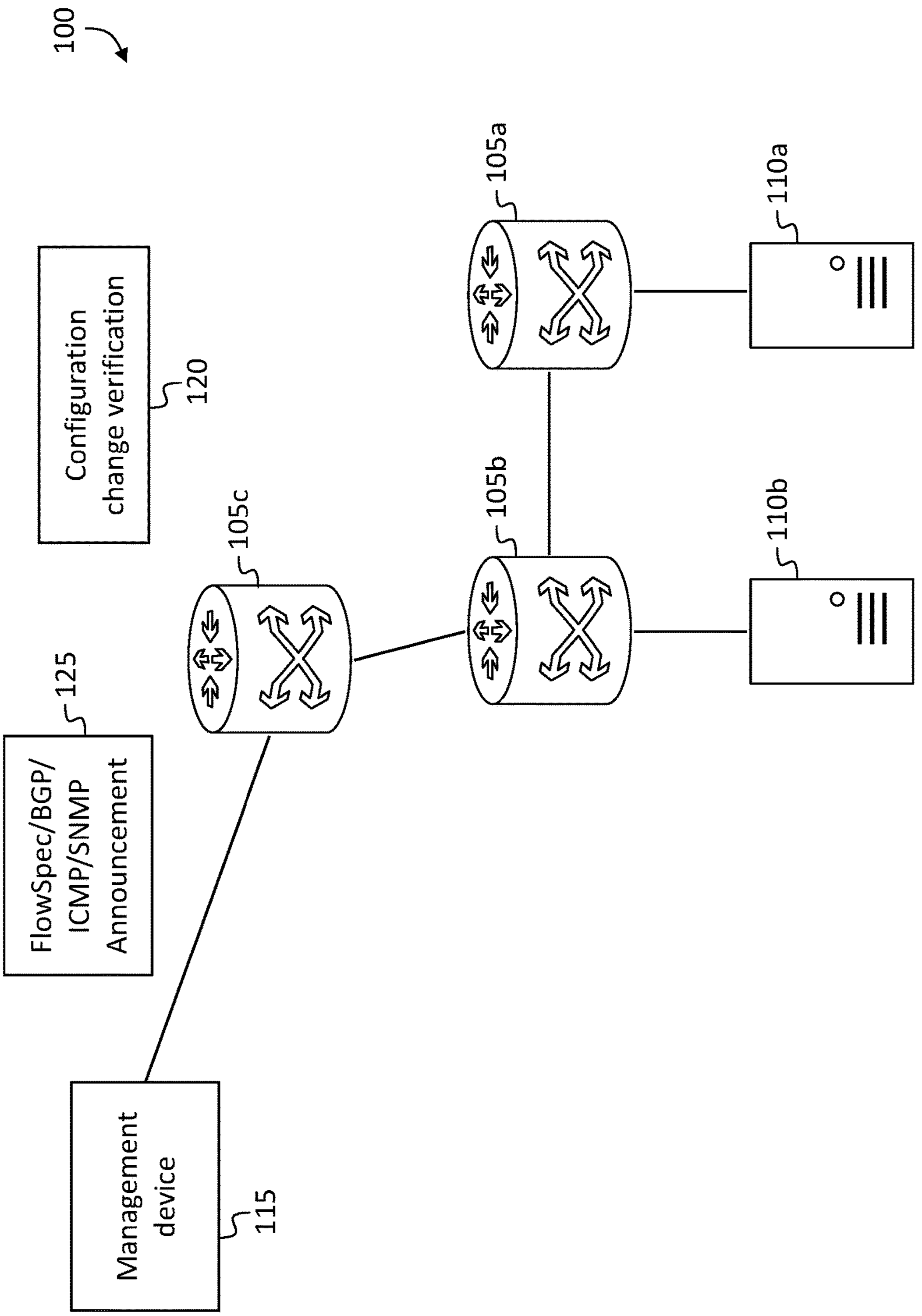
FIG. 1 is a block diagram of an example of a portion of a network, according to an example of the present disclosure.

FIG. 1 is a block diagram of an example of a portion of a network 100. In the example of FIG. 1, the portion includes (i) a first router 105*a*, a second router 105*b*, and a third router 105*c* (the three routers being collectively referred to as routers 105), and (ii) a first server 110*a* and a second server 110*b* (the two servers being collectively referred to as servers 110). The first server 110*a* is operatively connected to the first router 105*a* and the second server 110*b* is operatively connected to the second router 105*b*. The first router 105*a* is also operatively connected to the second router 105*b*, which is also operatively connected to the third router 105*c*. A management device 115, which may be a server, an appliance, a configuration tool or cluster, or an operator terminal, is operatively connected to the third router 105*c*, and may be used to make network configuration changes (and, as discussed below, to request network impact assessments for such changes). The network 100 may be, or may be part of, an autonomous system (AS). Although examples are discussed herein in which routers are the network devices performing methods disclosed herein, in other examples and embodiments different network devices (e.g., hubs, repeaters, bridges, switches, gateways and bridge-routers (brouters)) may also or instead perform the same or similar methods, to similar effect.

In operation, an operator (e.g., a network administrator) may contemplate' a configuration change in the network, for example to mitigate a threat, an attack, or an anticipated attack, to improve the efficiency of the network, or to increase (or decrease) the size of the network. Such a configuration change may involve, for example, distributing a new filter to routers 105 on the network, or on a portion of the network. In examples, the filter may include (e.g., be) an outbound filter (which may selectively block packets addressed to the exterior of the autonomous system), or an inbound filter (which may selectively block packets received from the exterior of the autonomous system), or it may apply to all traffic traversing the routers 105. In part because the effect of the filter, when applied to any given router 105, may depend on (i) the location of the router within the network (e.g., which other routers 105 a particular router 105 is connected to), and (ii) the effect of the filter on other routers, the effect of the distribution of a new filter on the network as a whole may not be readily ascertainable by the operator.

As such, in some examples the network components (or "devices") (e.g., the routers 105 and the servers 110) may be configured to provide, in response to a suitable request, a network impact assessment for a contemplated network configuration change, before the configuration change is implemented. For example, the management device 115 (which may operate as the requestor) may send (e.g., under the control of the operator) such a request for a network impact assessment, and it may receive one or more responses (as discussed in further detail below) and cause a display, to an operator, of information based on the one or more responses, to assist the operator in determining whether to implement the contemplated network configuration change.

The network impact assessment may be performed in various ways. In some examples, the network impact assessment is performed recursively. The request for the network impact assessment may sent to a first device (e.g., to the third router 105*c*, as discussed in further detail below), which may (i) identify a first set of one or more impacted devices, and (ii) send the request for the network impact assessment to each of the first set of impacted devices. Each of the devices of the first set of impacted devices may handle the request for the network impact assessment in the same manner, e.g., each of these devices may identify an additional respective set of impacted devices and forward the request for the network impact assessment to each of them. The request for the network impact assessment may be sent in or as an announcement or message 125, for example, in a FlowSpec announcement, a Border Gateway Protocol announcement, an Internet Control Message Protocol (ICMP) message, or a Simple Network Management Protocol (SNMP) message.

At each level (e.g., at each iteration of the recursion), a second device may be determined, by a first device, to be an impacted device if the contemplated network configuration change would affect communication between the first device and the second device. As used herein, "communication between the first device and a second device" includes communications between the first device and a third device that flow through the second device. As such, a configuration change that causes the first router 105*a* to block (e.g., drop) packets addressed to the first server 110*a* may be referred to as a configuration change which "affects communication" (as this phrase is used herein) between the first router 105*a* and the second router 105*b*.

In this manner the request for the network impact assessment may be distributed within the network to all devices (e.g., routers 105 and servers 110) that may be impacted by the contemplated network configuration change. Each device that receives the request for the network impact assessment may send the request for the network impact assessment to all devices, of the devices to which it is connected, that may be impacted by the contemplated network configuration change. For example, if the contemplated network configuration change is a change to a filter, then any router 105 that has addresses failing within the range of the filter may be determined to be an impacted device. This process may be repeated recursively until every device in the network that is potentially impacted by the contemplated change has received the request for the network impact assessment.

The responses to the request for the network impact assessment may be collected and aggregated in various ways. In some examples, after a receiving device receives the request for the network impact assessment from a requesting device, the receiving device forwards the request to one or more downstream devices, and waits to receive responses from the downstream devices (which may include responses from other devices further downstream). When it has received, from each downstream device, a response (or a time-out has occurred, as discussed in further detail below), it aggregates (i) the responses it has received and (ii) an assessment of the impact the contemplated network configuration change would have on the receiving device, and returns the aggregated response to the requesting device. If there are no downstream devices (e.g., if there is no route out from the receiving device that is different from the route in, as is the case, for example, for the first server 110*a* and for the second server 110*b*), then the receiving device may immediately return, to the requesting device, an assessment of the impact the contemplated network configuration change would have on the receiving device. In this manner, the requestor may eventually receive one or more aggregated responses that together characterize the effect the contemplated network configuration change is expected to have on each device in the network. The impact on any device may be characterized in various ways. For example, a device may report that a contemplated network configuration change will result in its (i) becoming entirely disconnected, or (ii) becoming unable to receive network traffic from the upstream device, or (iii) becoming unable to send traffic to the upstream device.

As mentioned above, in some examples, it may be possible for a request for a network impact assessment to time out. For example, a limit may be set on the maximum acceptable delay before a response is received from a device. Such a limit may be, for example, between 1 second and 10 minutes, e.g., it may be about one minute. When a receiving device receives the request for the network impact assessment and forwards it to one or more downstream devices, it may wait at most as long as the maximum acceptable delay, and then aggregate all of the responses it has received, and its own response, and return the aggregated response to the requesting device, even if some of the downstream devices have not yet responded. For any downstream device from which the receiving device has not yet received a response, it may insert, in the aggregated response it returns to the requesting device, an indication that the request timed out, as an indication that the response is incomplete.

In some examples, instead of responses being sent back along the same paths along which the request for the network impact assessment was distributed, each device that receives the request for the network impact assessment may send its response directly to a central system (e.g. a server or collection of servers), e.g., to the management device 115 or to a configuration change verification system 120. The configuration change verification system 120 may then forward the aggregated responses to the management device 115. In such an example the delay incurred in returning the responses to the management device 115 may be reduced, especially for responses from devices that are separated from the management device 115 by a large number of hops. In some examples, the management device 115 may, before sending a request for a network impact assessment, contact a central coordination system (e.g., the configuration change verification system 120, or another suitable central server) for, e.g., information or instructions regarding the protocol and version to be employed in sending the request for the network impact assessment, or for authorization (e.g., for an authorization token issued by the configuration change verification system 120 and recognized by the routers 105) to send the request for the network impact assessment.

For example, in the network 100 of FIG. 1, a fully recursive network impact assessment may be performed as follows. A request for a network impact assessment may be sent by the management device 115 to the third router 105*c*. The third router may forward the request for the network impact assessment to the second router 105*b*, which may forward it to the second server 110*b* and to the first router 105*a*. The second server 110*b* may, because there is no route out from the second server 110*b* that is different from the route in, send a response to the second router 105*b*, specifying how, if at all, the second server 110*b* would be impacted by the contemplated network configuration change. The first router 105*a* may forward the request for the network impact assessment to the first server 110*a* which may similarly send a response, to the first router 105*a*, specifying how, if at all, the first server 110*a* would be impacted by the contemplated network configuration change.

Upon receipt of the response from the first server 110*a*, the first router 105*a* may determine that it has received all of the responses it expects to receive, and it may (i) add to the response received from the first server 110*a* its own response (specifying how if at all, the first router 105*a* would be impacted by the contemplated network configuration change, and (ii) send the aggregated response to the second router 105*b*. Upon receipt of the responses from the second server 110*b* and from the first router 105*a*, the second router 105*b* may determine that it has received all of the responses it expects to receive, and (i) aggregate the received responses with its own response and (ii) send the aggregated response to the third router 105*c*. The third router 105*c* may then similarly aggregate the received aggregated response with its own response and send the resulting aggregated response to the management device 115. A partially recursive network impact assessment may involve, as mentioned above, recursive distribution of the request for the network impact assessment, and immediate sending, by each device that receives the request, of a response to a central system (e.g., to the management device 115 or configuration change verification system 120).

As mentioned above, making filter changes on routers 105 in the network may have impacts such as producing outages in portions of the network. Routing changes also may have unintended and undesired consequences, such as (i) security weaknesses, e.g., if a network in the autonomous system becomes accessible from outside the autonomous system, contrary to the intended constraints of the network design, or (ii) unreliable routing, e.g., if two networks are inadvertently configured with the same, or overlapping, sets of internet protocol (IP) addresses.

In some examples, an impact factor may be calculated from the responses received when a request for a network impact assessment is sent. The impact factor may be, for example, a percentage change (as a result of the contemplated network configuration change) in reachable internet protocol (IP) addresses. The impact factor may be used by an operator contemplating making the network configuration change, to determine whether to proceed. In some examples, automatic safeguards may be in place to prevent an operator from inadvertently making a network configuration change with an unacceptably large impact (e.g., with an impact factor exceeding a threshold), or to prevent an operator from making such a change unless, e.g., (i) the operator has a sufficient level of authority or (ii) the change has been separately authorized by another operator (e.g., a supervisor).

For example, the management device 115 may include a network impact system (which may be an application running in the management device 115). In such an example, a request to make a network configuration change may be received. Such a request can be received through a user interface provided by the management device 115, through an application programming interface, or through some other type of signaling to the management device 115. In response, the management device 115 may send a request for a network impact assessment for the requested network configuration change. Once the responses, to the request for a network impact assessment, have been received, the network impact system may determine, based on the set of impacted devices (and, in some examples, based on other factors, such as the level of authority of the operator, and whether additional approval has been granted), whether to approve the request to make the network configuration change. In some examples, a request is received by the management device 115 to make a network configuration change, and the request itself may include an instruction to automatically approve the first network configuration change if the impact factor for the network configuration change is below a threshold. The management device 115 may then send a request for a network impact assessment, calculate the impact factor based on the response or responses, and determine whether to approve the request automatically (or whether to proceed with implementing the network configuration change) based on whether the impact factor exceeds a threshold. In other examples, or when the impact factor exceeds the threshold, the network configuration change may need to be manually approved by a user, of the management device 115, having appropriate credentials.

In some examples, one or more of the routers 105 may be software defined routers or they may be routers implemented using network function virtualization (VFN). In such a router, the ability to process requests for network impact assessments may be implemented without significantly impacting the data plane performance of the router. For example, a software defined router may include a plurality of processing circuits (e.g., CPUs), some of which may be dedicated to data plane processing, and some of which may be dedicated to control plane processing. The processing of requests for the network impact assessment may, in such a router, be performed by one or more processing circuits dedicated to control plane processing, so that the performance of data plane functions by the router may be essentially unaffected.

Figure 2A:
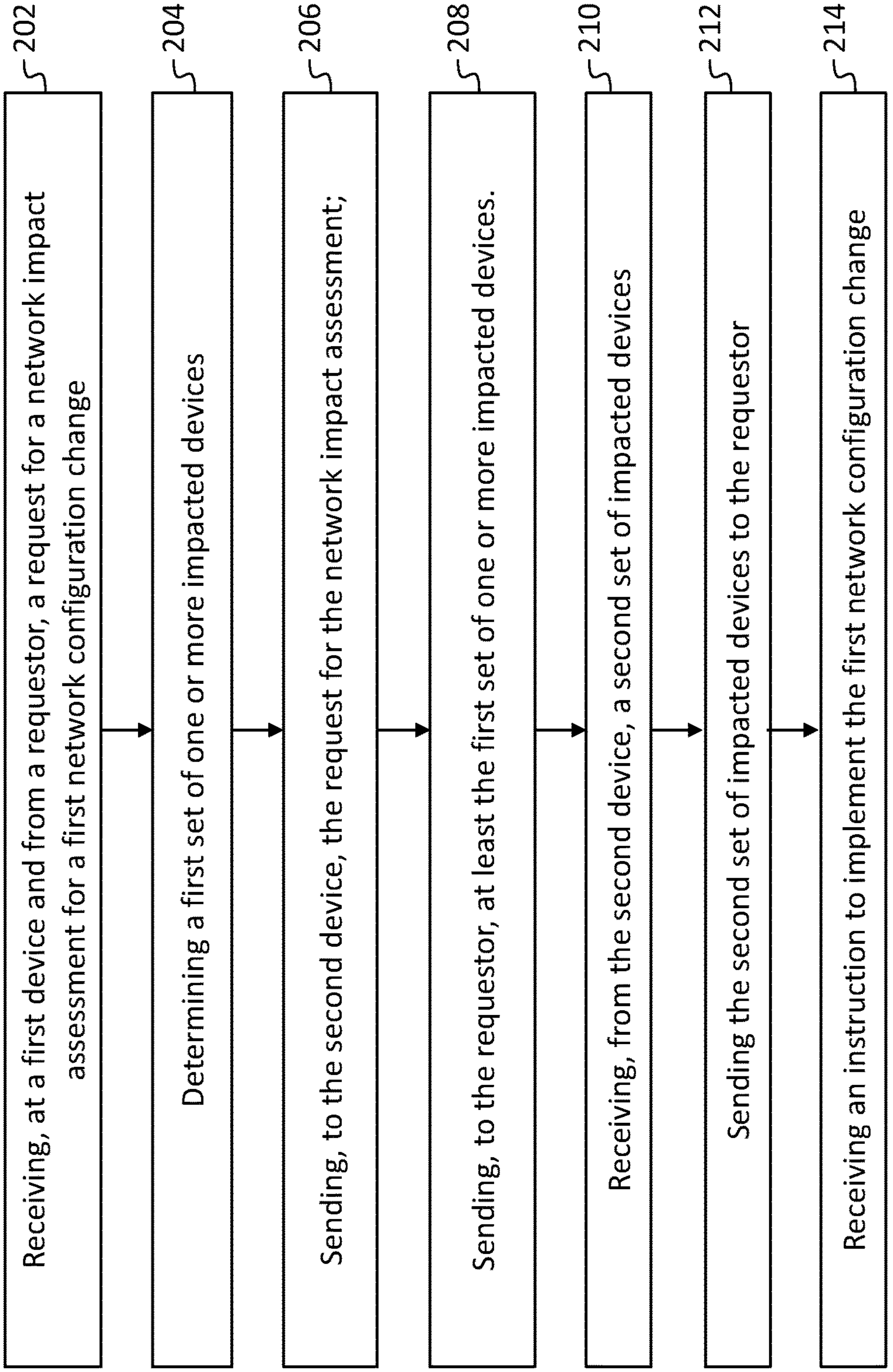
FIG. 2A is a flow chart of a method, according to an example of the present disclosure.

FIGS. 2A-2E are flowcharts of methods according to some examples described herein. Referring to FIG. 2A, in some examples a request for a network impact assessment for a first network configuration change is received, at 202, at a first device and from a requestor; a first set of one or more impacted devices, is determined, at 204, wherein the first network configuration change would affect communication between the first device and a second device, and the first set includes at least the second device; the request for the network impact assessment is sent, at 206, to the second device; and, at 208, at least the first set of one or more impacted devices is sent to the requestor. In some examples, the method further includes: receiving, at 210, from the second device, a second set of impacted devices; and sending, at 212, the second set of impacted devices to the requestor. In some examples, the method further includes: receiving, at 214, from the requestor and after sending the first set of one or more impacted devices to the requestor, an instruction to implement the first network configuration change.

Figure 2B:
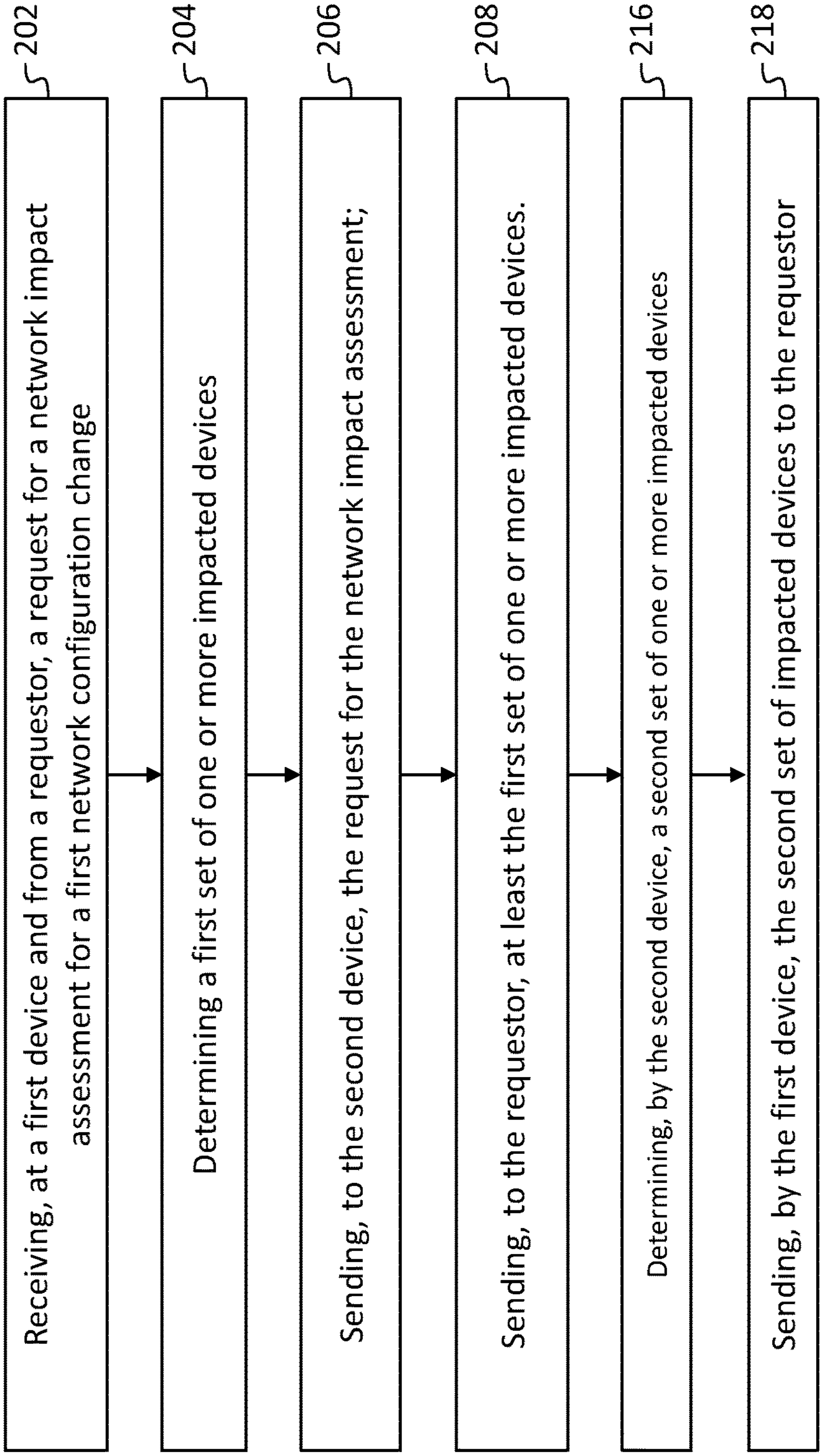
FIG. 2B is a flow chart of a method, according to an example of the present disclosure.
Figure 2C:
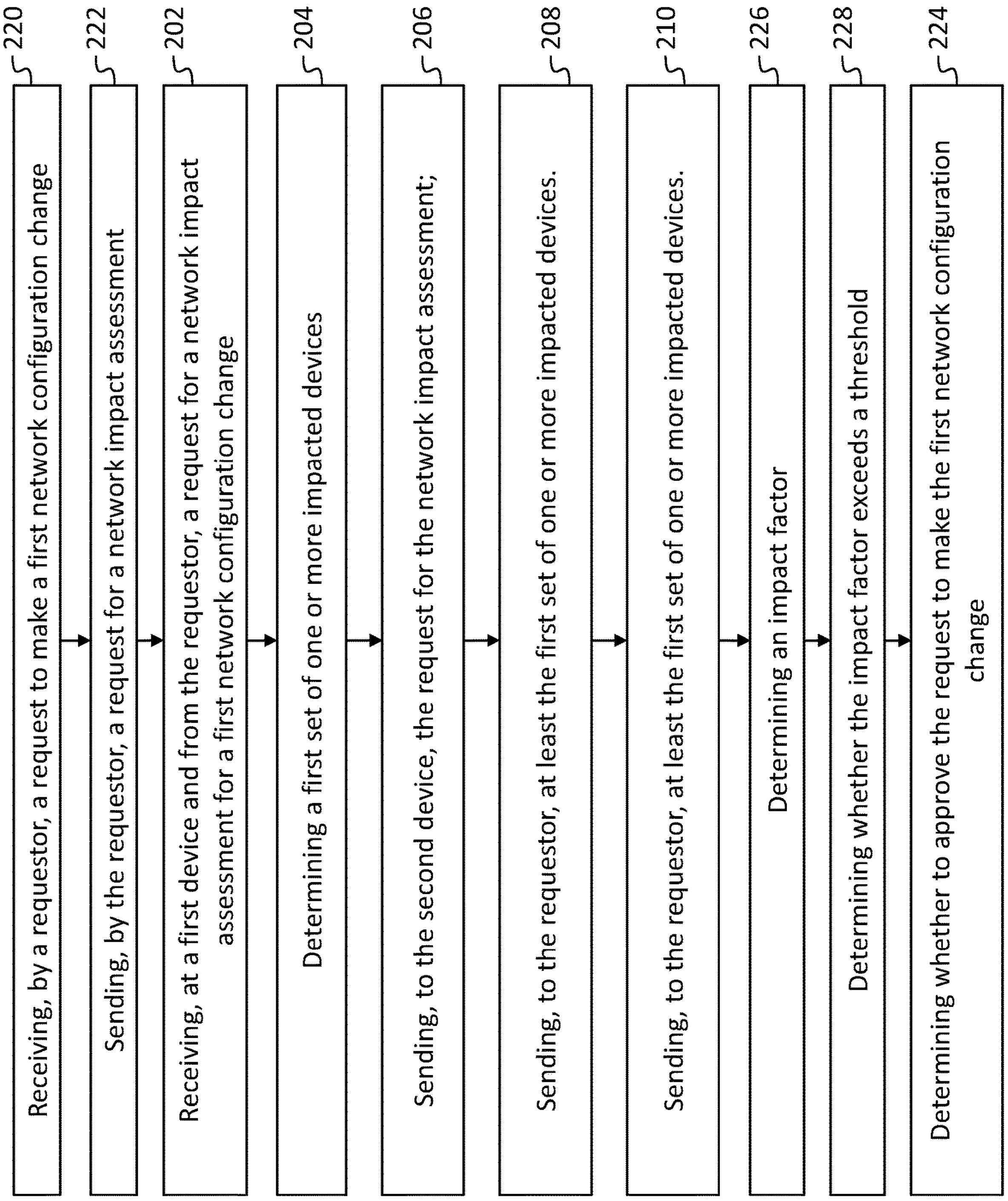
FIG. 2C is a flow chart of a method, according to an example of the present disclosure.

Referring to FIG. 2B, in some examples, the method includes determining, at 216, by the second device, a second set of one or more impacted devices, wherein the first network configuration change would affect communication between the second device and a third device, and the second set includes at least the third device; and sending, at 218, by the second device, the second set of impacted devices to the requestor. Referring to FIG. 2C, in some examples, the requestor includes a network impact system, and the method further includes receiving, at 220, by the requestor, a request to make the first network configuration change; sending, at 222, by the requestor, the request for the network impact assessment for the first network configuration change; and determining, at 224, based at least on the first set of one or more impacted devices, whether to approve the request to make the first network configuration change. In some examples, the request to make the first network configuration change includes an instruction to approve the first network configuration change if an impact factor for the first network configuration change is below a threshold; the method further includes determining, at 226, based at least on the first set of one or more impacted devices, the impact factor; and the determining whether to approve the request to make the first network configuration change includes determining, at 228, whether the impact factor exceeds the threshold.

Figure 2D:
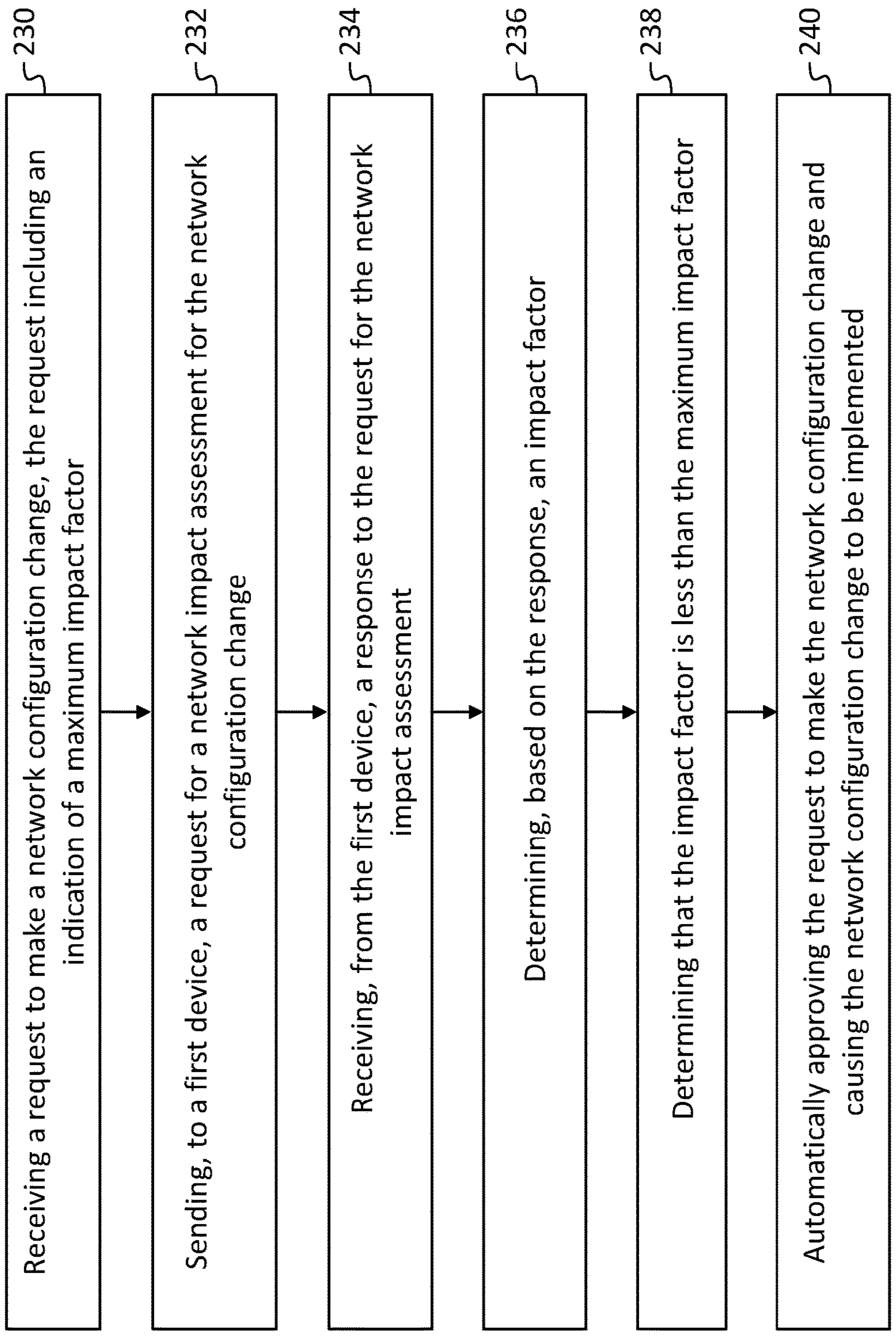
FIG. 2D is a flow chart of a method, according to an example of the present disclosure.
Figure 2E:
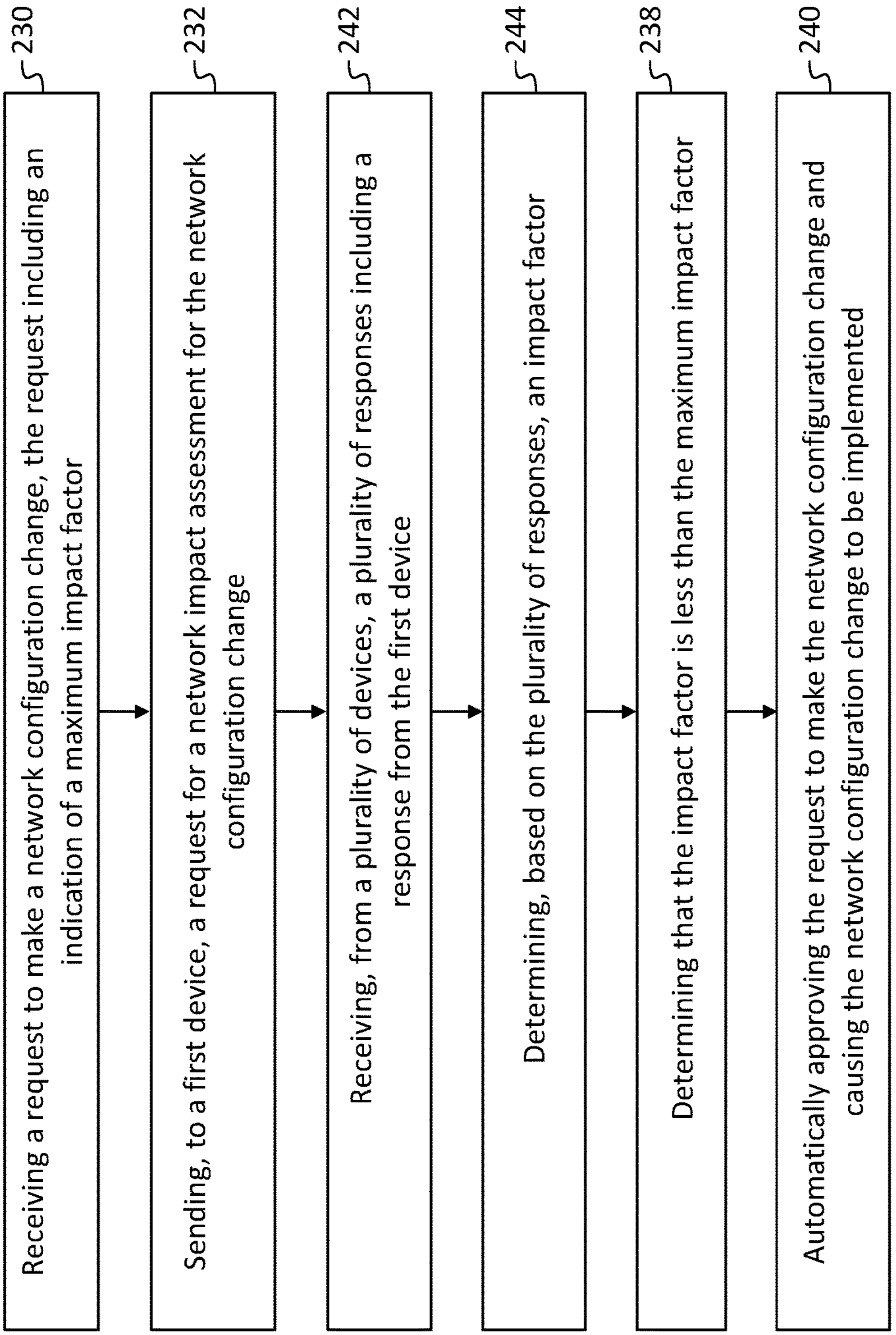
FIG. 2E is a flow chart of a method, according to an example of the present disclosure.

Referring to FIG. 2D, in some examples, a request to make a network configuration change is received, at 230, the request including an indication of a maximum impact factor; a request for a network impact assessment for the network configuration change is sent, at 232, to a first device; a response to the request for the network impact assessment is received at 234, from the first device; an impact factor is determined, at 236, based on the response; it is determined, at 238, that the impact factor is less than the maximum impact factor; and in response to determining that the impact factor is less than the maximum impact factor, at 240 the request to make the network configuration change is automatically approved and the network configuration change is caused to be implemented. Referring to FIG. 2E, in some examples, the method includes receiving, at 242, a plurality of responses including the response from the first device, and the determining of the impact factor comprises determining, at 244, the impact factor based on the plurality of responses.

Figure 3:
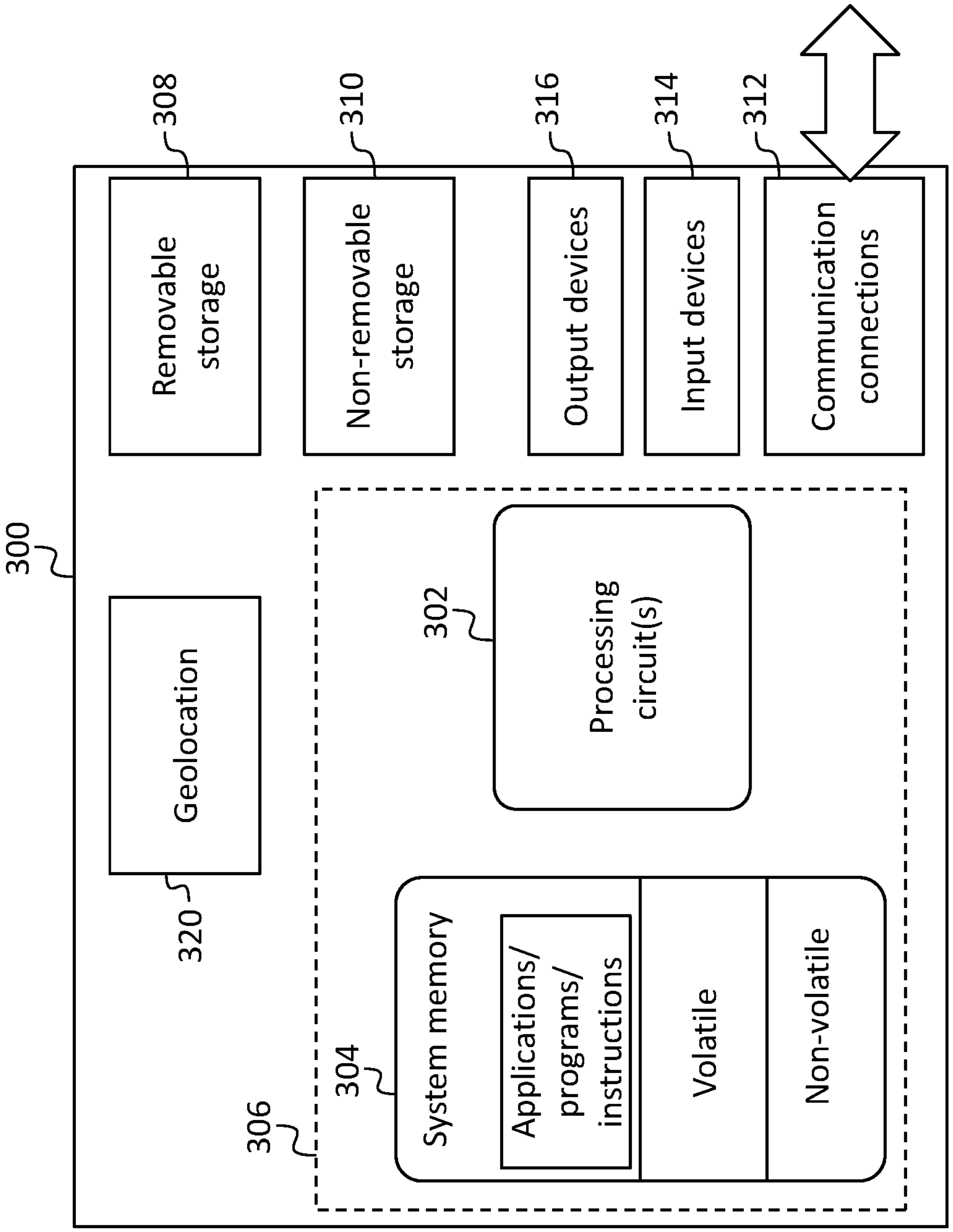
FIG. 3 is a block diagram of an operating environment, according to an example of the present disclosure.

FIG. 3 depicts an example of a suitable operating environment 300, portions of which may be used to implement the routers 105, the servers 110, the management device 115, the configuration change verification server 120, a user computing device, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and tangible and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. The term "processing circuit" is used herein to mean any combination of hardware, firmware, and software, employed to process data or digital signals. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

Although exemplary embodiments of a system and method for predicting outcomes of network configuration changes have been specifically described and illustrated herein, many modifications and variations will be apparent to those skilled in the art. Accordingly, it is to be understood that a system and method for predicting outcomes of network configuration changes constructed according to principles of this disclosure may be embodied other than as specifically described herein. The invention is also defined in the following claims, and equivalents thereof.

What is claimed is:

1. A method comprising:

receiving, at a first device and from a requestor, a request for a network impact assessment for a first network configuration change;

determining, by the first device, a first set of one or more impacted devices, wherein the first network configuration change would affect communication between the first device and a second device, and the first set comprises at least the second device;

sending, by the first device to the second device, the request for the network impact assessment;

receiving, by the first device and from the second device, a second set of impacted devices; and sending, by the first device to the requestor, at least the first set of one or more impacted devices and the second set of impacted devices.

2. The method of claim 1, further comprising:

determining, by the second device, a second set of one or more impacted devices, wherein the first network configuration change would affect communication between the second device and a third device, and the second set comprises at least the third device; and sending, by the second device, the second set of impacted devices to the requestor.

3. The method of claim 1, wherein the first network configuration change comprises a change to a network filter.

4. The method of claim 1, wherein the first network configuration change comprises a change to a routing configuration.

5. The method of claim 1, further comprising receiving, from the requestor and after sending the first set of one or more impacted devices to the requestor, an instruction to implement the first network configuration change.

6. The method of claim 1, wherein the requestor comprises a network impact system, the method further comprising:

receiving, by the requestor, a request to make the first network configuration change;

sending, by the requestor, the request for the network impact assessment for the first network configuration change; and determining, based at least on the first set of one or more impacted devices, whether to approve the request to make the first network configuration change.

7. The method of claim 6, wherein:

the request to make the first network configuration change comprises an instruction to approve the first network configuration change if an impact factor for the first network configuration change is below a threshold;

the method further comprises determining, based at least on the first set of one or more impacted devices, the impact factor; and the determining whether to approve the request to make the first network configuration change comprises determining whether the impact factor exceeds the threshold.

8. The method of claim 7, wherein the impact factor comprises a percentage change in reachable internet protocol addresses.

9. A system, comprising:

a first device comprising:

at least one processing circuit; and memory, operatively connected to the at least one processing circuit and storing instructions that, when executed by the at least one processing circuit, cause the first device to perform a method, the method comprising:

receiving, from a requestor, a request for a network impact assessment for a first network configuration change;

determining a first set of one or more impacted devices, wherein the first network configuration change would affect communication between the first device and a second device, and the first set comprises at least the second device;

sending, to the second device, the request for the network impact assessment;

receiving, by the first device and from the second device, a second set of impacted devices; and sending, to the requestor, at least the first set of one or more impacted devices and the second set of impacted devices.

10. The system of claim 9, further comprising the second device, wherein the method further comprises:

determining, by the second device, a second set of one or more impacted devices, wherein the first network configuration change would affect communication between the second device and a third device, and the second set comprises at least the third device; and sending, by the second device, the second set of impacted devices to the requestor.

11. The system of claim 9, wherein the first network configuration change comprises a change to a network filter.

12. The system of claim 9, wherein the first network configuration change comprises a change to a routing configuration.

13. The system of claim 9, wherein the method further comprises receiving, from the requestor and after sending the first set of one or more impacted devices to the requestor, an instruction to implement the first network configuration change.

14. The system of claim 9, further comprising the requestor, wherein the requestor comprises a network impact system, the method further comprising:

receiving, by the requestor, a request to make the first network configuration change;

sending, by the requestor, the request for a network impact assessment for a first network configuration change; and determining, based at least on the first set of one or more impacted devices, whether to approve the request to make the first network configuration change.

15. The system of claim 14, wherein:

the request to make the first network configuration change comprises an instruction to approve the first network configuration change if an impact factor for the first network configuration change is below a threshold;

the method further comprises determining, based at least on the first set of one or more impacted devices, the impact factor; and the determining whether to approve the request comprises determining whether the impact factor exceeds the threshold.

16. The system of claim 15, wherein the impact factor comprises a percentage change in reachable internet protocol addresses.

* * * * *